G. LISPENARD.
COTTON HARVESTER.
APPLICATION FILED JULY 6, 1912.
1,084,214.
Patented Jan. 13, 1914.
2 SHEETS—SHEET 2.
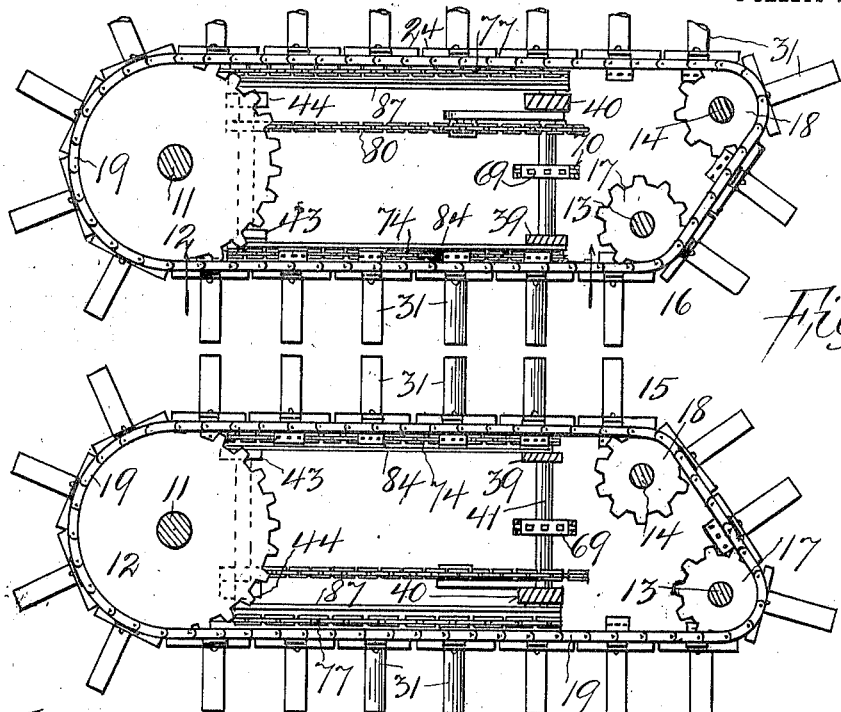
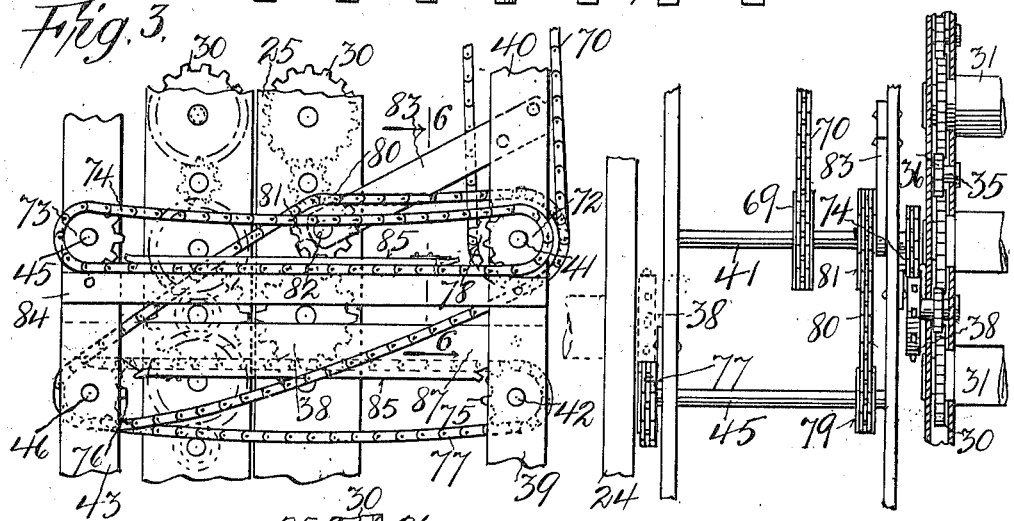
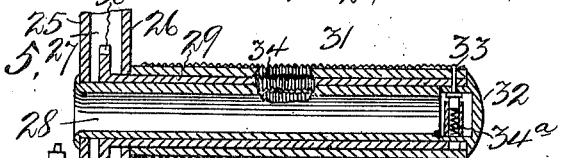
Witnesses:
Inventor
George Lispenard
By his Attorney
Charles G. Hensley

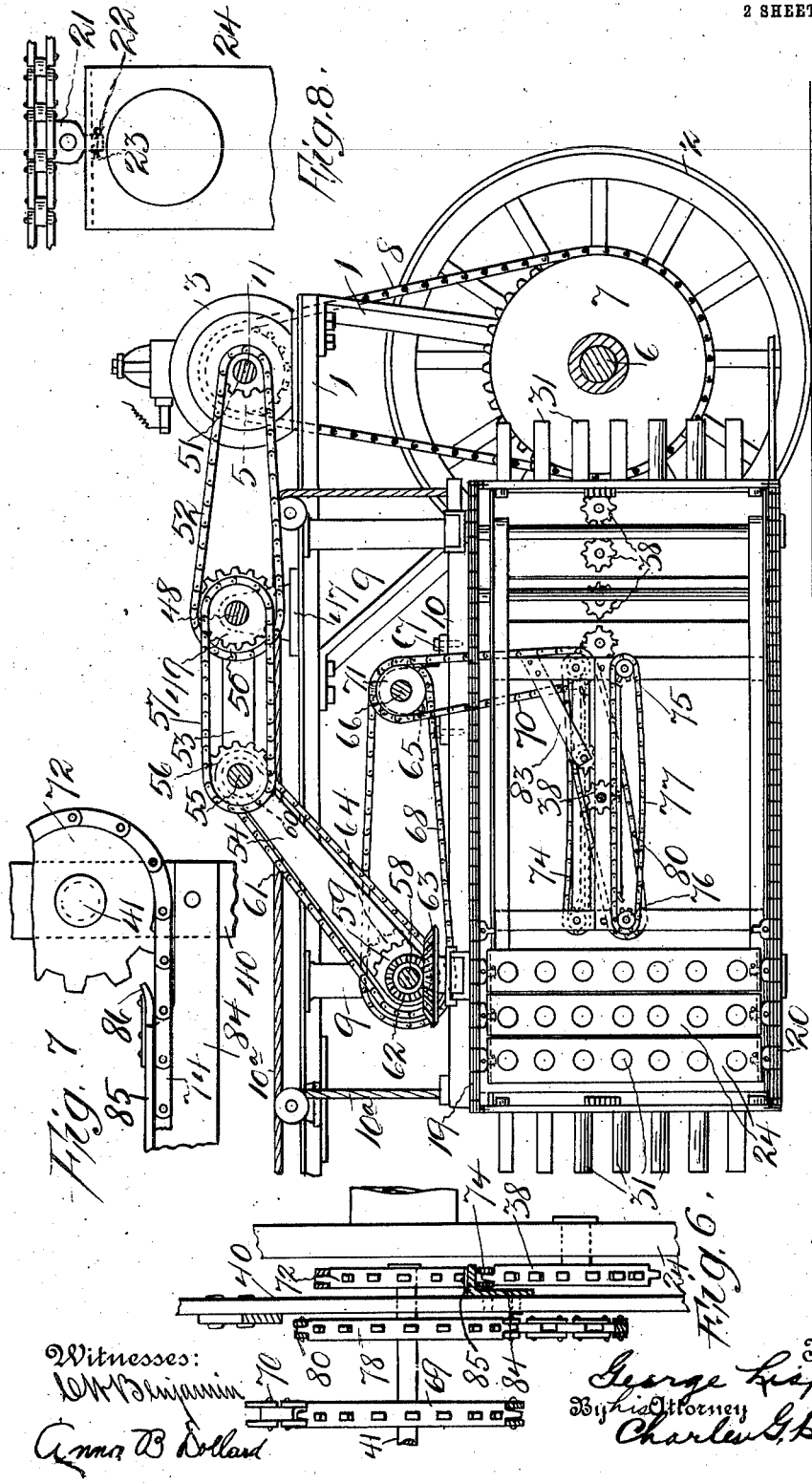

UNITED STATES PATENT OFFICE.

GEORGE LISPENARD, OF NEW YORK, N. Y., ASSIGNOR, BY MESNE ASSIGNMENTS, TO WALLIS-LISPENARD COTTON HARVESTER CORPORATION, OF NEW YORK, N. Y., A CORPORATION OF NEW YORK.

COTTON-HARVESTER.

1,084,214.  Specification of Letters Patent.  Patented Jan. 13, 1914.

Application filed July 6, 1912. Serial No. 707,972.

*To all whom it may concern:*

Be it known that I, GEORGE LISPENARD, a citizen of the United States, and a resident of the borough of Brooklyn, city of New York, county of Kings, and State of New York, have invented certain new and useful Improvements in Cotton-Harvesters, of which the following is a specification.

My invention relates to a cotton harvester; and more particularly to that class of harvesters which includes machines of vehicular type.

My invention relates to the general class of machine which is shown in U. S. Letters Patent issued to me on the 28 day of Feb. 1905 and numbered 783,792; wherein a vehicle of the self propelled type is constructed so as to travel between the rows of cotton plants and to straddle a row of plants. This class of machine is provided with a plurality of endless belts, each carrying a number of picker stems which are continually presented to and withdrawn from, the cotton plants; and while in juxtaposition to the plant they are revolved to cause the teeth on their peripheries to engage and remove the ripe cotton from the bolls. Such stems are usually revolved in one direction during the picking of the cotton, and in a reverse direction during the discharging of the cotton therefrom. The object of my present invention is to improve the picking mechanism, so that the picker stems may be operated more evenly and smoothly and without breakage or derangement; with less power for their operation; and, generally, to improve the operation of the picking mechanism. Heretofore, the picker stems while traveling around with the endless picker belts upon which they were mounted, were themselves revolved by means of stationary rack bars with which the gears or pinions of the picker stems meshed; the revolution of the stems being caused by the movement of the picker belts relatively to the stationary racks. This form of mechanism was proven to be weak and unsatisfactory in several respects. It interfered with the even and regular movement of the picker belts themselves, because the resistance to their movement, by the engagement of the picker stem gears with the stationary racks was very great, and was irregular. Furthermore, the operating force was so multiplied, that slight resistances to the revolution of the picker stems was so magnified in other parts of the mechanism, that the operation of the same was sometimes resisted to such an extent as to cause breakage in the parts. The entire cotton picking mechanism was under too great a strain for practical purposes. Another objection to machines where the pickers were operated by racks was that the picker stems had to be operated at the same speed while picking the cotton as when they were discharging their cotton.

In the present invention I eliminate the above objections and provide a machine which is much smoother in its operation, free from the usual breakage and which requires less power to operate it successfully. To accomplish this I provide a power transmission from the source of power, for operating the endless picker belts; and a power transmission from the source of power to the picker stems themselves; so that there is a transmission for the picker belts and another for the picker stems. Preferably, these transmissions are combined from the source of power as far as the movable supporting frame which carries the picker belts, in order to simplify the mechanism, and still obtain the advantages of separate transmissions. I am, through this construction, not dependent upon the relative movement of the picker belts and a stationary mechanism, for revolving the stems. This avoids undue strain in the various parts, as well as breakage. Another advantage is, that I am able to operate the picker stems at the proper speed for obtaining the best results. Another object of my invention is to provide operating mechanism for the picker stems, which will revolve the stems at the most advantageous speed while in the plant, for picking the cotton; and which will operate the picker stems at a greater speed during the operation of discharging their cotton, in order that the centrifugal force will assist in discharging the cotton from the picker stems. I have found it to be advantageous to operate the picker stems at a greater speed during the discharging of their cotton than when picking it; and though it was not practicable to provide for this difference of speed, in the former machines having a rack drive for the picker stems, nevertheless this is very successfully accomplished in the present machine.

Another object of my invention is to provide a machine having the above mentioned advantages, in which the most successful features of former devices may be retained and utilized in the present combinations. For this purpose I prefer to embody the present improvements in combination with a machine having a picker frame which may be raised and lowered to correspond with the height of cotton plants upon which the machine is put to work.

Other advantages will be made apparent in the detailed description of one embodiment of my invention.

In the drawings forming part of this application, Figure 1 is a vertical sectional view of a portion of a cotton harvester, showing my invention, Fig. 2 is a horizontal sectional view showing the picking mechanism mounted upon the movable frame. Fig. 3 is an enlarged detail view showing the principal parts of the picker stem drive, in elevation, Fig. 4 is a plan view thereof, Fig. 5 is a sectional view showing a portion of a picker belt, and the arrangement of one of the picker stems thereon, Fig. 6 is a sectional view, taken on the line 6—6 of Fig. 3. Fig. 7 is an enlarged detail elevation of one of the devices for insuring the engagement of the picker gear with its operating mechanism, and Fig. 8 is an enlarged detail, showing the attachment of the bars or sections of the picker belt to the chain.

The device consists, primarily, of a vehicle, the rear half only of which is herein shown because the remainder of the vehicle is well known and is disclosed in former patents (see for instance, U. S. Patent No. 975,775). The vehicle, in so far as it is herein shown, consists of the supporting frame 1 which is carried upon wheels 2 which travel over the ground; and I prefer to call this frame the stationary frame because it does not partake of any special movement relatively to the cotton plants other than straddling a row and moving thereover. This frame is preferably constructed in substantial accordance with that shown in my U. S. Letters Patent issued Nov. 15th, 1910, and numbered 976,084.

Upon the frame 1 is mounted the means for furnishing the motive power for propelling the vehicle and operating the picking devices; and while any suitable power generating means may be used for this purpose I prefer to use an explosive engine of the hydrocarbon type, which is indicated generally in the drawings as 3. On the shaft 4 of this engine there is provided a sprocket 5 while on the axle 6 of the vehicle there is provided a sprocket 7. By means of a chain 8 traveling over these sprockets, the operating force is transmitted from the generator or source of power, to the traction means, to drive the vehicle. Preferably this is duplicated for each side of the machine as is shown in my said patent.

Upon the main or supporting frame are provided posts or guides 9 upon which is movably supported a picker frame 10 which carries the picking mechanisms. This frame may be raised and lowered by any suitable mechanism operating on the ropes or cables 10$^a$. Upon this movable frame are arranged the endless picker belts, which are alike, but arranged to face one another, so as to operate from each side upon the same row of cotton plants as the vehicle travels over the row. Upon shafts 11 are mounted sprocket wheels 12 which serve to drive the picker belts. Toward the rear are arranged shafts 13. 14 for each picker device 15 and 16, one slightly in advance of and laterally spaced from, the other. These shafts carry sprockets 17, 18, which are in the same horizontal plane as the sprockets 12 on the shafts 11. The sprockets 17, 18, are idlers only, as they only guide the picker belts.

The picker belts 15, 16, each consists of upper and lower endless chains 19, 20 which travel around the sprockets 12, 17 and 18, the former serving to propel the chains. Between these chains are connected the belt sections or picker boxes, the members which carry the picker stems. These sections or boxes are arranged to articulate, so that the picker belt as a whole is flexible enough to travel around their several sprockets. The chains 19, 20 have connecting plates 21 secured thereto at spaced intervals, those on the former chain extending downwardly and those on the latter extending upwardly. These plates each have pivot pins 22 which extend into opposite ends of the picker boxes 24 and are held in connection therewith by cotter pins 23. Each picker box is therefore pivotally connected at top and bottom with the chains. These picker boxes may be constructed in any desired manner in so far as the present invention is concerned, but I prefer the construction herein shown. That is, they preferably consist of inner and outer plates 25, 26 spaced apart and connected by end pieces 27 to form an inclosure for the picker stem gears. The picker stems themselves are mounted upon these boxes, preferably a vertical row on each box; and they are revoluble. Bearings 28 are secured upon the inner plates 25 of the picker boxes, and extend therethrough and through the outer plates 26 sufficiently to form bearings or supports for the picker stems. Over these bearings are arranged sleeves 29 which extend through the outer plates 26 of the boxes; and on their ends between the inner and outer plates of the boxes, they have fixed gears 30. The picker stems 31, here shown as cylindrical bodies, fit over the sleeves 29 and are held thereon and caused to turn therewith, by means of a cap 32 and a pin 33 which is forced through apertures in the cap, sleeve and stem, by springs 34ª. The peripheries of the stems 31 are so formed that the stems are capable of collecting or picking the ripe cotton from the cotton bolls when revolved in one direction, and of discharging the cotton when revolved in a reverse direction. For this purpose I prefer to provide teeth 34 on the picker stems, as shown in Fig. 5, which slant or are directed at angle to the radius of the stems. This particular stem is only shown as one form of stem which may be used with my present invention, but any other stem capable of picking and discharging the cotton may be used. Furthermore, the particular form of stem herein shown forms the subject matter of an application for patent filed by me on the 14th day of Nov. 1910 which is serially numbered 592,170.

All the stems on a box are preferably geared together. Journaled between the inner and outer plates of the picker boxes are short shafts 35 which carry pinions 36. The pinions are arranged between and mesh with, the gears 30 on adjacent picker stem sleeves, so that a train of gears is thereby formed; which causes all the stems on a box to revolve in unison and in the same direction. One of the shafts 37 which carries one of the intermediate pinions 36 extends through the inner plate 25 of the picker box; and on its inner end it is provided with a sprocket 38. This construction is the same on all the picker boxes of both picker belts. Preferably the sprocket 38 is arranged at the vertical middle of the boxes, so that all the sprockets 38 come in the same horizontal line. By imparting a revolving motion to the sprocket 38 all the picker stems may be revolved.

In upright posts 39, 40 of the movable frame are journaled the shafts 41, 42 which are shown at right angles to the longitudinal line of the vehicle. In other upright posts, 43, 44, of the movable frame, are journaled shafts 45, 46, shown parallel with shafts 41, 42. The shafts 42, 46 are shown on a lower horizontal plane than shafts 41, 45 for a purpose which will appear hereinafter. This shaft arrangement is the same for both picker mechanisms.

Upon the upper part of the stationary frame there is journaled upon brackets 47, a shaft 48 which carries the sprockets 49 and 50.

There is a second sprocket 51 on the shaft of the power generator 3; and over this sprocket, and the sprocket 49, travels a chain 52; whereby the power from the engine, or generator, is transmitted to shaft 48. Arms 53, which fulcrum on the shaft 48, are connected to arms 54 by a shaft 55 which forms a knuckle or toggle connection. The shaft 55 has a sprocket 56 and over this, and the sprocket 50, travels a chain 57; whereby the power is carried to shaft 55. There is a horizontal shaft 58 journaled on the movable picker frame, which carries a sprocket 59. Over the latter, and a sprocket 60 travels another chain 61. The operating force for moving the picker belts and for revolving the picker stems is distributed from the shaft 58. When the movable frame is raised or lowered, the action in no way interferes with the transmission, because of the toggle connection just described, upon which, portions of the transmission mechanism are carried.

From the shaft 58 the power for moving the picker belts is transmitted by means of gears 62 on said shaft 58, mitering with gears 63 on the upright shafts 11. These latter carry the sprockets 12 which propel the chains, so that the power transmitted through the above transmission mechanism operates to propel both picker belts in unison.

The transmission for operating the picker stems themselves is separate from the above, or at least there is a separate means for operating the stems. I prefer to utilize the above transmission down as far as shaft 58, for the picker operation, in order to simplify the mechanism and reduce the number of parts, but the transmission for the picker stems in any event is operated from the generator.

Upon the horizontal shaft 41 which operates the picker belts, and which is itself operated from the source of power, there is arranged the sprocket 69 over which travels the chain 70. For simplicity in illustration only one set of devices in this branch of the mechanism is shown because the parts are exactly the same for the picker stems of both picker belts. Upon a bracket 67 on the movable frame is journaled a shaft 66 which has secured thereon a sprocket 71 over which the chain 70 also travels. Over another sprocket 65 on the shaft 66 travels a chain 68 which also travels over a sprocket 64 on the shaft 58 which forms part of the picker operating mechanism. The transmission has been traced, in the above description, from the generator to the shaft 41 of the picker stem operating mechanism. There is a shaft 45 mounted in the upright bars 43, 44, of the movable frame, which is shown parallel and on the same horizontal plane with the shaft 41; or a short distance above the shaft 46. The shaft 41 has fixed on the end thereof, a sprocket 72; and on shaft 45 there is an idler sprocket 73 in line with sprocket 72. A chain 74 travels over these sprockets receiving its driving action from the shaft 41. A shaft 46 is journaled in the upright bars 43, 44, below shaft 45, and parallel and on the same plane with, shaft 42. The shaft 42 is provided with an idler sprocket 75, while shaft 46 is provided with a fixed sprocket 76; and over these sprockets travels a chain 77; the latter receiving its driving action from shaft 46. It will thus be observed that chain 77 is driven from the opposite end to chain 74. Chains 74 are arranged near the inner runs of picker belts 15, 16, while chains 77 are arranged near the outer runs thereof. The purpose of this is to have one of these chains operate the picker stems while traveling with the inner run of the picker belt, or during the picking operation, and the other while the stems are traveling with the outer run of the picker belt, or during the operation of discharging the cotton from the stems.

The shaft 46 is preferably driven from the shaft 41; and for this purpose I provide a sprocket 78 fixed upon shaft 41; and a sprocket 79 fixed on shaft 46, over which sprockets travels a chain 80. The chain 77 is to be operated at a different speed to that of chain 74 and for this reason I prefer to provide for the differential speed by making sprocket 78 larger than sprocket 79; in order that shaft 46 which operates chain 77 will be driven faster than shaft 41 which drives chain 74. Preferably the sprocket 78 is three times the size of sprocket 79, in order that the speed of shafts 46 and 41 will be three to one; though this relative proportion is not imperative.

I prefer to provide an idler sprocket 81 on a shaft 82 journaled in a bracket 83; in order to guide the chain 80 and take up any slack therein.

It will be noted that chains 74 and 77 are spaced laterally apart for some distance; and that the lower run of chain 74 is about as much higher than the upper run of chain 77 as the diameter of the sprockets 38 on the picker boxes.

I provide means for insuring the engagement of the teeth of sprockets 38 with chains 74 and 77, since the sprockets only engage the chains at certain times. On the upright bars 39, 43, I provide an L shape bracket 84 the horizontal plate 85 of which lies over the lower run of chain 74 and prevents the latter from rising while the sprockets 38 are traveling in mesh therewith. A clip 86 is hinged to the end plate 85 nearest the sprocket 72; and this clip is pressed downwardly against the lower run of chain 74. A bracket 87 is similarly supported upon the bars 40, 44 and its horizontal plate 85 lies just under the upper run of chain 77 and prevents the latter sagging and thereby disengaging from the sprockets 38. This plate 87 also has a clip 86 hinged thereto; but this clip presses the upper run of chain 77 upwardly. The clip 86 of plate 87 is arranged near the sprocket 76, because it is there where the sprockets 38 come into mesh with the chain. The above arrangement is the same for both picker belts.

Operation: The vehicle is propelled along the ground by means of the power transmitted from the generator to the wheels and the vehicle straddles the row of plants from which the cotton is to be picked. The movable frame may be adjusted in position to suit the plants to be operated upon, by means of the lifting ropes. As the vehicle travels forward, the picker belts are moved continuously around their sprockets 12, 17, 18, being propelled by the former. The inner runs of the picker belts travel backwardly about the same speed that the vehicle travels forwardly, so that the picker stems simply enter into and recede from, the several plants without moving to any great extent along the row of plants. While the picker boxes are traveling on the inner runs of the belts, their picker stems are revolved in one direction to pick the cotton from the ripened bolls; and while the picker boxes are traveling on the outer runs of the picker belts, their picker stems are revolved in a reverse direction and at a greater speed to their picking movement. Between these two operations the stems are idle, as they are then disconnected from their operating means. When a picker box first comes upon the inner run of the picker belt, its sprocket 38 approaches the chain 74 in such a position that the teeth thereof engage the lower run of this chain. If the top of a sprocket tooth should fail to enter the chain link, it will strike the block of the chain and will force the chain slightly upwardly against the resistance of the spring clip; whereupon the clip will serve to turn the sprocket enough to bring about the meshing of its tooth with the chain. After that the sprocket meshes with the chain until it reaches the end of the run, when it disengages therefrom and is no longer revolved. While the sprockets are engaged with the chain as above, the sprockets are moving lengthwise of the vehicle, with the picker belt, whereas the lower run of chain 74 is traveling in a reverse direction; and this causes the picker stems to revolve and thereby gather the ripened cotton. This operation goes on successively as each picker box reaches the chain 74 since all the stems on a given picker box are geared together, the revolving action imparted by the chain 74 to the sprocket 38 causes all the stems on the box to move alike.

When a picker box has traversed the inner run of the picker belt its sprocket disengages from chain 74, whereupon the box will swivel loosely. When the box turns the loop of the picker belt it will return with the outer run of the belt; and after turning, the picker stems will point in the opposite direction to what they did while picking. That is, they will point outwardly, instead of inwardly. When a picker box comes near sprocket 76 its sprocket 38 will engage the upper run of chain 77 because the latter is arranged lower than chain 74. The sprocket will come to mesh with the chain and will be assisted in meshing, by the action of the clip on plate 87, pressing upwardly on the chain 77. The sprocket will remain in mesh with this chain until the sprocket travels the length of the upper run of this chain. During such travel, the sprocket travels in one direction, with the picker belt, while the upper run of chain 77 travels in a reverse direction. The picker stems will therefore be revolved to cause them to drop their cotton, which may be caught upon any suitable conveyer to be conveyed to a suitable receptacle. The chain 77 which operates the picker stems during the discharging of the cotton operates faster than chain 74 which operates them during the picking operation, because the sprocket 78 being larger than the sprocket 79, which it operates, the shaft 46, which drives the chain 77 operates faster than the shaft 41 which drives the chain 74. This difference in speed could not be obtained on former machines where the pickers were revolved by stationary racks. If operated very fast while picking, the stems would not properly pick the cotton and would be apt to injure the cotton plant. While, if operated too slowly during the discharging of the cotton, they would fail to properly discharge.

From the above it will be seen that the endless picker belts are operated from the generator which propels the vehicle. It will also be apparent that the picker stems are revolved by a transmission device which is operated from the same generator. By providing transmissions for operating both the picker belts and the picker stems I am able to operate the latter at the desired speed; and faster while discharging than while picking the cotton. By providing transmission for the belts and the picker stems, the whole machine operates without binding and there is less resistance. Furthermore there is not such a strain on the picker boxes and the stems, so that breakage of these parts is eliminated. It is also to be noted that I preserve all the advantages of the movable picker frame.

While I have described, in detail, the preferred embodiment of my invention, it is to be understood that changes may be made in the construction and arrangement without departing from the scope of the annexed claims.

Having described my invention, what I claim is—

1. In a cotton harvester the combination of a vehicle, a movable picker belt carried by the vehicle, revoluble picker stems carried by the picker belt, motive power generating means carried upon the vehicle, transmission mechanism for operating the picker belt and an independent chain and sprocket transmission mechanism for revolving said picker stems, operated by said generating means.

2. In a cotton harvester the combination of a vehicle, a picker belt carried by the vehicle and composed of picker supporting members, revoluble picker stems carried thereby, transmission mechanism for operating the picker belt and an independent transmission for revolving the picker stems, comprising a chain arranged to revolve said picker stems while the same are traveling with one run of the picker belt, and another chain arranged to revolve said picker stems while on another run of said picker belt, and in a reverse direction to their operation by said first chain.

3. In a cotton harvester the combination of a vehicle, a picker belt carried by the vehicle and composed of picker supporting members, revoluble picker stems carried thereby, a chain arranged to revolve said picker stems while the same are traveling with one run of the picker belt, and another chain arranged to revolve said picker stems while on another run of said picker belt, and in a reverse direction to their operation by said first chain, power generating means carried by said vehicle and means for operating said chains from said power generating means.

4. In a cotton harvester the combination of a vehicle, picker belts carried thereby and arranged with inner and outer runs, said belt having picker stem supports, revoluble picker stems carried therewith, and having operating sprockets, a chain substantially parallel with the inner run of the picker belt and arranged so that the picker stem sprockets, while traveling with the inner run of the picker belt, will engage the run of said chain which travels in an opposite direction to the travel of said stems, a second chain substantially parallel with the outer run of the picker belt, and arranged so that the picker stem sprockets, while traveling with the outer run of said picker belt, will engage the run of said second chain, which travels in an opposite direction to the travel of said stems on the outer run of the picker belt, and means for operating said chains.

5. In a cotton harvester the combination of a vehicle, picker belts carried thereby and arranged with inner and outer runs, said belts having picker stem supports, revoluble picker stems carried therewith, and having operating sprockets, a chain substantially parallel with the inner run of the picker belt and arranged so that the picker stem sprockets, while traveling with the inner run of the picker belt, will engage the run of said chain which travels in an opposite direction to the travel of said stems, a second chain substantially parallel with the outer run of the picker belt and arranged so that the picker stem sprockets, while traveling with the outer run of said picker belt, will engage the run of said second chain, which travels in an opposite direction to the travel of said stems on the outer run of the picker belt, said chains being arranged so that they will revolve said picker stems in one direction while they are traveling with the inner run of the picker belt and in an opposite direction while they are traveling with the outer run thereof.

6. In a cotton harvester the combination of a vehicle, picker belts carried thereby and arranged with inner and outer runs, said belts having picker stem supports, revoluble picker stems carried therewith, and having operating sprockets, a chain substantially parallel with the inner run of the picker belt and arranged so that the picker stem sprockets, while traveling with the inner run of the picker belt, will engage the run of said chain which travels in an opposite direction to the travel of said stems, a second chain substantially parallel with the outer run of the picker belt and arranged so that the picker stem sprockets, while traveling with the outer run of said picker belt, will engage the run of said second chain, which travels in an opposite direction to the travel of the stems while on the outer run of the picker belt, said chains being arranged so that they will revolve said picker stems in one direction while they are traveling with the inner run of the picker belt and in an opposite direction while they are traveling with the outer run thereof, power generating means and means operated thereby, for operating said chains at different relative speeds.

7. In a cotton harvester the combination of a vehicle, a picker belt having inner and outer runs, and including picker stem supports, revoluble picker stems carried thereby having operating sprockets, and means for revolving said stems, comprising a plurality of chains operating on said sprockets to revolve the stems and arranged substantially parallel respectively with the inner and outer runs of the picker belt, forward and rearward shafts for each of said chains, power generating means carried by the vehicle, means for transmitting power from said generator to drive one shaft of one of the chains and means for transmitting power from said driven shaft to the oppositely arranged shaft of the other chain.

8. In a cotton harvester the combination of a vehicle, a picker belt having inner and outer runs, and including picker stem supports, revoluble picker stems carried thereby, and means for revolving said stems, comprising a plurality of chains arranged substantially parallel respectively with the inner and outer runs of the picker belt, forward and rearward shafts for each of said chains, power generating means carried by the vehicle, means for transmitting power from said generator to drive one shaft of one of said chains, and means operated by said driven shaft and arranged to operate the oppositely arranged shaft of the other of said chains at a different speed to the said driven shaft.

9. A device of the character described comprising a vehicle, embodying a main supporting frame, power generating means carried thereby, a depending frame adjustable up and down on said main frame, a picker belt carried by said depending frame, having picker stems thereon, a shaft on said depending frame, means for operating said picker belt from said shaft, chains arranged to revolve said picker stems while they are traveling with the picker belt, means for operating said chains from said shaft, and flexible power transmission mechanism for transmitting power from said power generator to said shaft on the depending frame.

10. A device of the character described including a picker stem supporting means comprising vertically set plates, a stationary bearing rigidly mounted in one of said plates and protruding through the other of said plates, a rotative sleeve engaging on said stationary bearing, a picker stem mounted on said rotative sleeve, a gear rigidly mounted on said rotative sleeve, pinions mounted between said plates engaging the said gears on each of said rotative sleeves, an actuated chain for said rotative gears and a sprocket mounted on the shaft of one of said pinions engaging said actuated chain for causing rotative movement to be imparted to all of said rotative sleeves on said supporting means.

11. A device of the class described comprising a vehicle, a picker belt carrying picker stems and operating sprockets, said belt being arranged with an inner and an outer run, means for operating said belt, a chain for operating said operating sprockets to revolve said stems in one direction while traveling with one run of said belt, a chain for operating said sprockets to revolve said picker stems in a reverse direction while traveling with the other run of said belt, supporting plates for said chains and spring actuated members arranged to press said chains into operative relation with said sprockets as the latter approach said chains.

12. A cotton harvester comprising a movable belt having an inner and an outer run, picker stem supporting members carried thereby, rotative picker stems carried thereon, drive chains for revolving said stems, comprising a chain arranged to operate the picker stems in one direction while said stems are traveling with one run of said belt, and a chain adapted to operate said picker stems in a reverse direction while traveling with the other run of said belt, and means for operating said chains whereby the picker stems will be revolved faster while on one run of said belt than while on the other thereof.

13. A cotton harvester comprising movable coöperating picker belts having picker stem supporting members, rotative picker stems carried thereon, sprockets on said picker stem supporting members by which said stems are adapted to be revolved, drive chains revolving said picker stems, arranged parallel with the inner and outer runs of the picker belts, and means for causing said drive chains to travel in the same direction, said chains being arranged in different planes relative to the movement of said picker stem sprockets, whereby the latter will engage the upper run of one chain and the lower run of the other.

14. A cotton harvester comprising movable coöperating picker belts having picker stem supporting members, rotative picker stems carried thereon, sprockets on said picker stem supporting members by which said stems are adapted to be revolved, drive chains for said picker stems, arranged parallel with the inner and outer runs of the said picker belts, and means for causing said drive chains to travel in the same direction, said chains being arranged in different planes relative to the movement of said picker stem sprockets, whereby the latter will engage the upper run of one chain and the lower run of the other, and means for operating one of said chains at a greater speed than the other.

Signed at the city, county and State of New York, this 2nd day of July, 1912.

GEORGE LISPENARD.

Witnesses:
EDWARD D. C. SPERRY,
ANNA B. DOLLARD.